(12) United States Patent
Birkler

(10) Patent No.: US 9,323,410 B2
(45) Date of Patent: Apr. 26, 2016

(54) USER INPUT DISPLAYS FOR MOBILE DEVICES

(75) Inventor: Jörgen Birkler, San Mateo, CA (US)

(73) Assignee: Sony Ericsson Mobile Communications AB, Lund (SE)

( * ) Notice: Subject to any disclaimer, the term of this patent is extended or adjusted under 35 U.S.C. 154(b) by 2228 days.

(21) Appl. No.: 12/250,108

(22) Filed: Oct. 13, 2008

(65) Prior Publication Data

US 2010/0090965 A1  Apr. 15, 2010

(51) Int. Cl.
G06F 3/042 (2006.01)
G06F 3/046 (2006.01)
G06F 3/041 (2006.01)

(52) U.S. Cl.
CPC ............. *G06F 3/046* (2013.01); *G06F 3/042* (2013.01); *G06F 3/0412* (2013.01); *G06F 3/0421* (2013.01); *G06F 2203/04109* (2013.01)

(58) Field of Classification Search
USPC ........................................................ 345/173
See application file for complete search history.

(56) References Cited

U.S. PATENT DOCUMENTS

| | | | |
|---|---|---|---|
| 5,105,186 A | 4/1992 | May | |
| 7,196,694 B2 * | 3/2007 | Roberts | 345/173 |
| 7,230,608 B2 * | 6/2007 | Cok | 345/173 |
| 2005/0024341 A1 * | 2/2005 | Gillespie et al. | 345/173 |
| 2006/0097991 A1 | 5/2006 | Hotelling et al. | |
| 2006/0192766 A1 | 8/2006 | Nakamura et al. | |
| 2006/0214892 A1 | 9/2006 | Harada et al. | |
| 2006/0214926 A1 * | 9/2006 | Kolmykov-Zotov et al. | 345/179 |
| 2008/0012835 A1 | 1/2008 | Rimon et al. | |
| 2008/0048996 A1 | 2/2008 | Hu et al. | |
| 2008/0074401 A1 | 3/2008 | Chung et al. | |
| 2008/0121442 A1 | 5/2008 | Boer et al. | |
| 2008/0122803 A1 | 5/2008 | Izadi et al. | |
| 2008/0158172 A1 | 7/2008 | Hotelling et al. | |
| 2008/0168403 A1 | 7/2008 | Westerman et al. | |
| 2008/0284746 A1 | 11/2008 | Kao et al. | |
| 2008/0297487 A1 | 12/2008 | Hotelling et al. | |
| 2010/0110002 A1 | 5/2010 | Burstrom et al. | |

FOREIGN PATENT DOCUMENTS

| | | |
|---|---|---|
| EP | 1 109 382 A2 | 6/2001 |
| GB | 2 339 273 | 1/2000 |
| WO | WO 03/073159 A1 | 9/2003 |

(Continued)

OTHER PUBLICATIONS

"How do touch-screen monitors know where you're touching?" http://computer.howstuffworks.com, 2 pages, 2008.

(Continued)

*Primary Examiner* — Amare Mengistu
*Assistant Examiner* — Shawna Stepp Jones
(74) *Attorney, Agent, or Firm* — Myers Bigel & Sibley, P.A.

(57) ABSTRACT

A mobile device for detecting user input on a display is provided. The mobile device includes a hand-held display unit. The hand-held display unit includes a display having an electromagnetic radiation detector. The electromagnetic radiation detector is configured to detect an electromagnetic radiation profile responsive to a position of a user input object when the position of the user input object is spaced apart from the display. A controller is configured to identify a user input from the electromagnetic radiation profile.

18 Claims, 6 Drawing Sheets

(56) References Cited

FOREIGN PATENT DOCUMENTS

| WO | WO 2005/057399 A2 | 6/2005 |
|---|---|---|
| WO | WO 2008/007372 A2 | 1/2008 |
| WO | WO 2010/018577 A2 | 2/2010 |

OTHER PUBLICATIONS

Notification of Transmittal of the International Search Report and the Written Opinion of the International Searching Authority, or the Declaration; International Search Report; Written Opinion of the International Searching Authority corresponding to International Application No. PCT/US2009/003126; Date of Mailing: Oct. 6, 2010; 15 pages.

Wilson, Andrew D., "TouchLight: An Imagining Touch Screen and Display for Gesture-Based Interaction," *ICMI'04*, Oct. 13-15, 2004, 8 pages.

The International Search Report and the Written Opinion for PCT/US2009/002433 mailed Mar. 24, 2010.

Written Opinion of the International Preliminary Examinging Authority date of mailing Apr. 4, 2011 for PCT/US2009/002433.

European Office Action Corresponding to European Patent Application No. 11 770 863.6; Dated: Jan. 21, 2014; 9 pages.

Hodges S. et al. "ThinSight: versatile multi-touch sensing for thin form-factor displays", *Conference on Human Factors in Computing Systems—Proceedings of the Sigchi Conference on Human Factors in Computing Systems 2007*, 2007 Association for Computing Machinery, UIST 2007, Oct. 2007, pp. 259-268.

Izadi S. et al. "ThinSight: integrated optical multi-touch sensing through thin form-factor displays", *Proceedings 2007 Workshop on Emerging Displays Technologies*, EDT 2007, ACM, vol. 252, Aug. 4, 2007, 4 pages.

European Examination Report Corresponding to European Application No. 11 770 863.6; Dated: Jul. 29, 2015; 7 Pages.

Notification Concerning Transmittal of International Preliminary Report on Patentability, PCT/IB2011/002123, Apr. 9, 2013, 14 pages.

Wikipedia, online encyclopedia "Touchscreen" Definition from Wikipedia.org, (http://en.wikipedia.org/wiki/Touchscreen) Accessed Jun. 2, 2009 (8 pages).

* cited by examiner

USER INPUT DISPLAYS FOR MOBILE DEVICES

FIELD OF THE INVENTION

The present invention relates to displays for a mobile device, and in particular, to displays for receiving user input.

BACKGROUND

Various technologies are available to detect stylus and/or finger contact in touch sensitive displays. For example, a resistive touchscreen panel includes two spaced-apart, thin metallic electrically conductive and resistive layers. When a user input object touches the panel, the layers are connected, causing a change in an electrical current. This change in electrical current is detected as a user input contact event. Resistive touchscreens are typically relatively precise, but may not be sufficiently sensitive, especially if the user's finger is used to contact the touch screen.

A capacitive touchscreen is typically coated with a material, such as indium tin oxide, that conducts a continuous electrical current across a sensor. The sensor exhibits a controlled field of stored electrons in both horizontal and vertical axes to achieve a capacitance. When the sensor's capacitance field is altered by another capacitance field, e.g., a user's finger, electronic circuits located at each corner of the panel measure the distortion and identify a location of the disturbance. Capacitive touch screens have a relatively high sensitivity, but the precision with which the location of the event is detected can be low.

A side-optical touchscreen uses a grid of optical detectors on top of the surface of the display. Light is sent from one side to the other and received by detectors both horizontally and vertically. The beams of light are broken when a finger or stylus is in close proximity such that the location can be translated into coordinates by the detectors. However, since the light sources and the detectors need to be placed on top of the display, this configuration builds height that is generally not desirable in mobile devices.

Another type of optical touchscreen uses the total internal reflection principle. A refractive medium is filled with light, and when a finger or other object is pressed against the surface, the internal reflection light path is interrupted, which results in light being reflected outside of the refractive medium. The light outside the refractive medium can be detected by a camera. Refraction-optical touchscreens generally have good sensitivity and precision. However, the space required for light sources and the refractive medium may increase the dimensions of the display and also limit the contrast of the display because it is combined with a camera, and therefore, this type of optical touchscreens may not be practical for use with hand-held devices.

Moreover, touchscreens may not be able to operate using the same general protocols as a mouse-based user interface because user inputs may be generated only upon contact with the screen. Thus, it may be more difficult for a user to track movement of an icon, for example, to select a region, than can be accomplished with a mouse. However, a mouse input device may not be desirable on a compact, hand-held device due to its size.

SUMMARY OF EMBODIMENTS OF THE INVENTION

In some embodiments, a mobile device for detecting user input on a display is provided. The mobile device includes a hand-held display unit. The hand-held display unit includes a display having an electromagnetic radiation detector. The electromagnetic radiation detector is configured to detect an electromagnetic radiation profile responsive to a position of a user input object when the position of the user input object is spaced apart from the display. A controller is configured to identify a user input from the electromagnetic radiation profile.

In certain embodiments, the display further includes an electromagnetic radiation emitter configured to emit electromagnet radiation in a direction away from the display, and the electromagnetic radiation detector is configured to detect electromagnetic radiation reflected from a user input object in a direction toward the display.

In certain embodiments, the electromagnetic radiation detector is configured to detect an obstruction of background electromagnetic radiation responsive to a position of a user input object.

In certain embodiments, the electromagnetic radiation detector is configured to detect thermal radiation from a user input object, wherein the user input object comprises a digit of a user's hand.

In some embodiments, the controller is configured to display an icon on the display responsive to the detection of electromagnetic radiation reflected from a user input object in a direction toward the display. The controller can be configured to track movement of the user input object by displaying the icon in a region responsive to movement of the user input object. The display can include a touch-sensitive display, and the controller can be configured to perform an operation responsive to contact with the user input object.

In some embodiments, the electromagnetic radiation detector is configured to detect infrared light.

In some embodiments, the electromagnetic radiation detector is a first electromagnetic radiation detector, and the display further includes an electromagnetic radiation emitter, a second electromagnetic radiation detector, and a refractive medium. The electromagnetic radiation emitter is configured to emit electromagnetic radiation in a direction toward the refractive medium, and the refractive medium is configured to reflect electromagnetic radiation in a direction toward the second electromagnet radiation detector. The refractive medium is further configured to change a direction of reflected electromagnetic radiation responsive to contact from a user input object. The controller is further configured to identify a user input responsive to an amount of electromagnetic radiation detected by the second electromagnetic radiation detector.

According to some embodiments of the present invention, a touch-sensitive display system includes a display having an electromagnetic radiation emitter, an electromagnetic radiation detector, and a refractive medium. The electromagnetic radiation emitter is configured to emit electromagnetic radiation in a direction toward the refractive medium, and the refractive medium is configured to reflect electromagnetic radiation in a direction toward the detector in an absence of contact from a user input object and to change a direction of reflected electromagnetic radiation responsive to contact from a user input object. A controller is configured to identify a user input responsive to an amount of electromagnetic radiation detected by the electromagnetic radiation detector.

In some embodiments, the refractive medium is configured to direct at least a portion of the reflected electromagnetic radiation away from the electromagnetic radiation detector responsive to contact from the user input object and the controller is configured to identify a user input responsive to a reduced amount of electromagnetic radiation detected by the electromagnetic radiation detector.

In some embodiments, the refractive medium changes a refractive index thereof responsive to contact of the user input object. The display can include an array of respective electromagnetic radiation emitters and electromagnetic radiation detectors. The electromagnetic radiation emitters can be configured to emit electromagnetic radiation in a direction toward the refractive medium, and the refractive medium can be configured to reflect electromagnetic radiation in a direction toward one of the respective electromagnetic radiation detectors in an absence of contact from a user input object and to change a direction of reflected electromagnetic radiation responsive to contact from the user input object. The array of electromagnetic radiation detectors can output an electromagnetic radiation profile to the controller, and the controller can be configured to identify a location of contact of the user input object based on the electromagnetic radiation profile. The location of contact of the user input object can include a region of reduced electromagnetic radiation. The display can include a substrate having a plurality of LEDs thereon, and the array of electromagnetic radiation emitters and electromagnetic radiation detectors can be on the substrate. The refractive medium can include a layer on the substrate and having a surface that reflects electromagnetic radiation emitted from the electromagnetic radiation emitters. In some embodiments, the electromagnetic radiation emitter is an infrared emitter and the electromagnetic radiation detector is an infrared detector.

According to some embodiments of the present invention, methods for detecting user input on a display include emitting electromagnetic radiation away from the display. An electromagnetic radiation profile is detected using an array of detectors on the display. The electromagnetic radiation profile includes electromagnetic radiation reflected from a user input object towards the display when a position of the user input object is spaced apart from the display. A user input is identified responsive to the electromagnetic radiation profile.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

Figure 1:
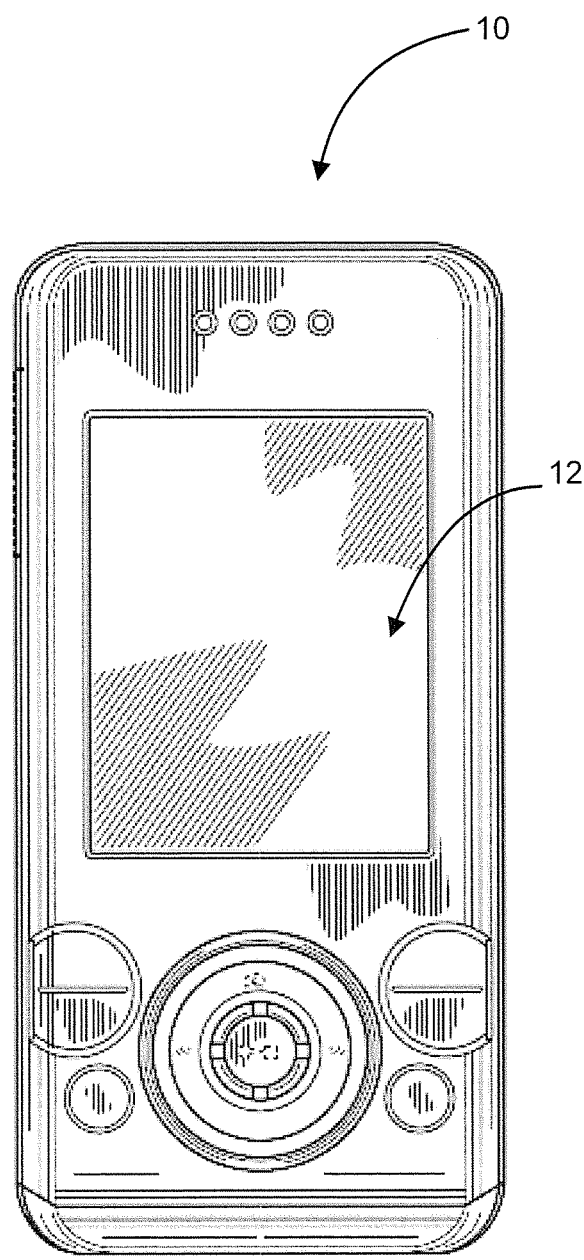
FIG. 1 is a front view of a mobile communications device having a display according to embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

As used herein, a "mobile terminal" includes, but is not limited to, a terminal that is configured to receive communication signals via a wireless interface from, for example, a cellular network, a Wide Area Network, wireless local area network (WLAN), a GPS system, and/or another RF communication device. Example mobile terminals include, but are not limited to, a cellular mobile terminal; a GPS positioning receiver; an acceleration measurement device with a wireless receiver; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver.

As used herein, a "display" includes, but is not limited to, a device capable of providing a visual representation, such as graphics, lighting or back-lighting for displaying information and/or for aesthetic purposes.

Figure 2:
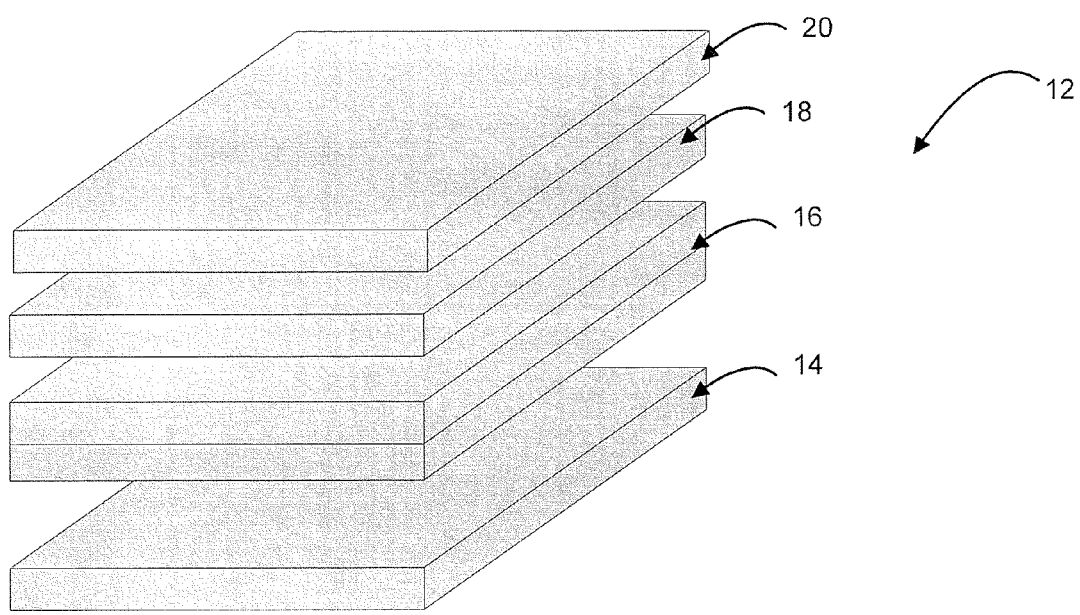
FIG. 2 is an exploded view of the display of FIG. 1.
Figure 3:
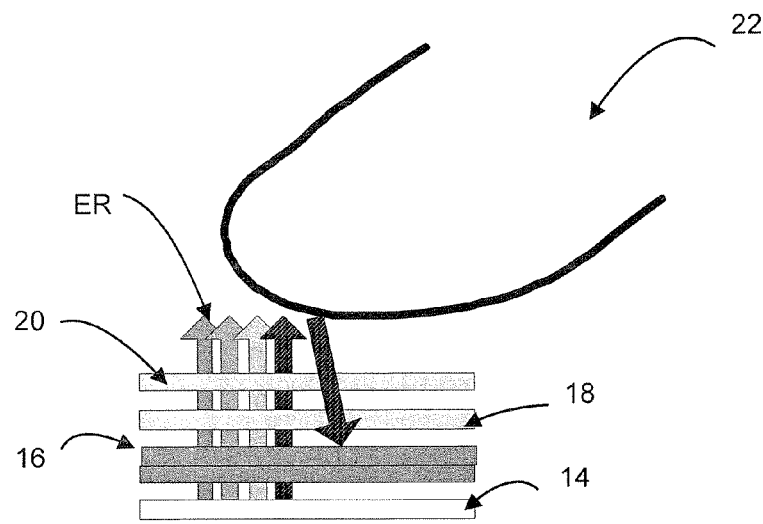
FIG. 3 is a cross sectional view of the display of FIG. 1.
Figure 4:
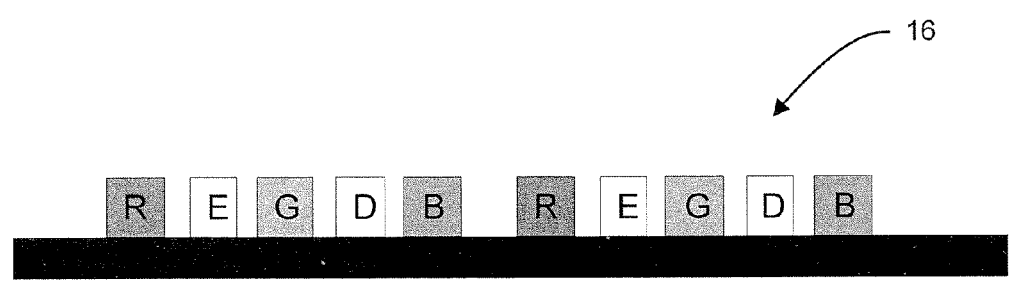
FIG. 4 is a cross sectional view of a layer of the display of FIG. 1 including electromagnetic radiation emitters and detectors according to embodiments of the present invention.

As illustrated in FIGS. 1-3, a hand-held mobile device 10 includes an LCD display 12. The display 12 includes a back-lighting layer 14, a liquid crystal layer 16, a protective layer 18 (such as glass) and a touch panel layer 20. As illustrated in FIG. 4, an alternative OLED configuration can be used in which the backlighting layer 14 and/or the liquid crystal layer 16 are omitted. The display 12 of FIG. 4 includes an array of electromagnetic radiation or infrared emitters E and electromagnetic radiation or infrared detectors D on a substrate S. The substrate S also includes light emitters, such as LEDs or OLEDs, that are used to display pixels of various colors on the display 12.

As shown in FIG. 3, the emitters emit electromagnetic radiation ER away from the display 12. If a user input object 22, such as a finger, is positioned adjacent the display 12, then the electromagnetic radiation ER is reflected in a direction toward the display 12. The reflected electromagnetic radiation ER can be detected by the detectors D in the liquid crystal layer 16. Contact between the user input object 22 and the display is not required, and the electromagnetic radiation ER can be reflected by the object 22 when the object 22 is spaced apart from the display 12.

Figures 5A, 5B, 5C, 5D:
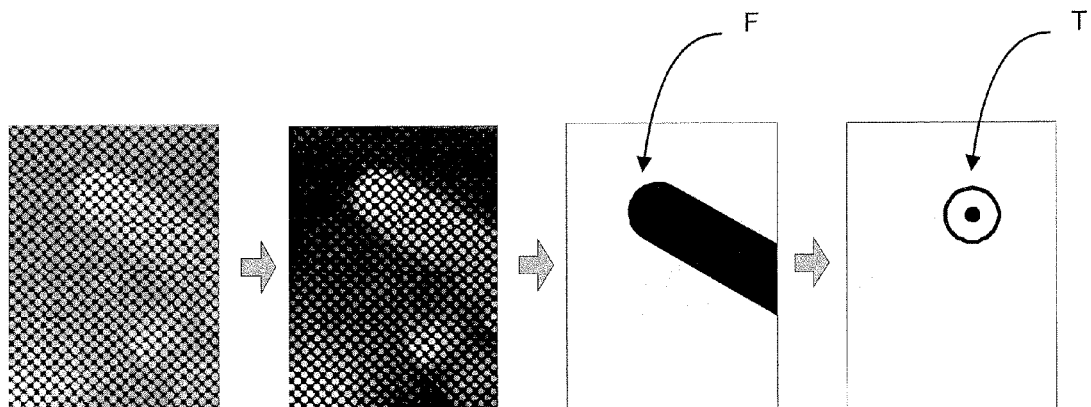
FIG. 5A is a digital image of an electromagnetic radiation profile according to embodiments of the present invention.
FIG. 5B is an enhanced image derived from the image of FIG. 5A.
FIG. 5C is a schematic illustration of an identification of a user input device using the images of FIGS. 5A-5B.
FIG. 5D is a schematic illustration of a target region identified based on the illustration of FIG. 5C.
Figure 6:
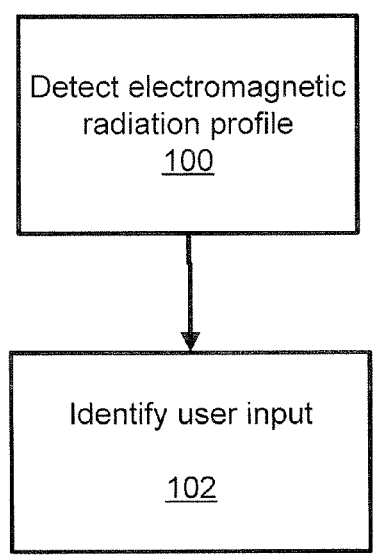
FIG. 6 is a flowchart illustrating operations according to embodiments of the current invention.

As illustrated in FIGS. 5A-5D and FIG. 6, the outputs of the electromagnetic radiation detector D can be used to generate an electromagnetic radiation profile (FIG. 5A; Block 100, FIG. 6), which can be used to identify a user input, such as a region of the display that is selected or highlighted by the user (FIG. 5D; Block 102, FIG. 6). In this configuration, a user input object, such as a finger or stylus, can be detected when the object is spaced apart and not in physical contact with the display 12.

For example, as shown in FIG. 5A, the data from the detectors D can be used to provide the electromagnetic profile image shown in FIG. 5A, which illustrates an exemplary electromagnetic radiation profile of a user's finger. The contrast between the pixels of the image can be enhanced as shown in FIG. 5B. The shape of the user's finger F can then be identified as shown in FIG. 5C. As shown in FIG. 5D, the target region T can then be identified, such as by using image analysis techniques known to those of skill in the art to identify a region from the shape of the finger F (e.g., the tip of the finger F). In some embodiments, the target region T is displayed on the display 12 of FIGS. 1-4, e.g., by displaying an icon in the target region T. Thus, movement of the user input object or finger F can be tracked on the display by displaying the icon responsive to movement of the finger F. In this configuration, various user inputs can be registered by the display without contact from the finger F.

In particular embodiments, the display 12 can further include a touch-sensitive display such that additional user inputs can be detected when a user input object contacts the display. In this configuration, user inputs to the display 12 may be used that are similar to those used in a conventional mouse environment. An icon, such as a traditional mouse arrow, can be moved when the user moves a user input object without contacting the display 12, such as is described with respect to FIGS. 5A-5D. When the user touches the display 12, another user input can be received by the mobile device 10 that may be analogous to selecting or "clicking" a mouse button at a particular location. Accordingly, the display 12 can detect motion and/or contact of a user input object to provide a user interface that is similar to a traditional mouse environment.

Although embodiments according to the present invention are described with respect to the infrared electromagnetic radiation emitters E and infrared electromagnetic radiation detectors D in FIG. 4, it should be understood that other suitable techniques can be used to provide an electromagnetic radiation profile responsive to a location of a user input object. For example, in some embodiments, the emitters E shown in FIG. 4 can be omitted, and the detectors D can be configured to detect an obstruction of background electromagnetic radiation responsive to a position of a user input object. In some embodiments, the electromagnetic radiation detectors D can be configured to detect thermal radiation, e.g., from a digit or finger of a user's hand.

Figure 7:
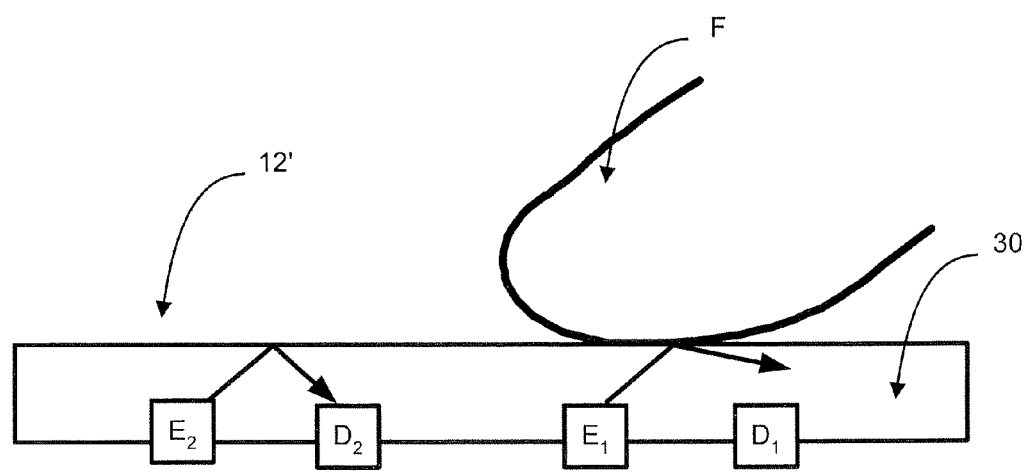
FIG. 7 is a cross sectional view of a touch-sensitive display according to some embodiments of the present invention.

According to further embodiments of the present invention, a touch-sensitive display system can be provided. As illustrated in FIG. 7, the display 12' can include an array of electromagnetic radiation emitters $E_1$, $E_2$ electromagnetic radiation detectors $D_1$, $D_2$ and a refractive medium 30. In the absence of contact from a user input object, such as a finger F and as shown with respect to the emitter $E_2$ and detector $D_2$, the emitter $E_2$ is configured to emit electromagnetic radiation toward the refractive medium 30, and the total internal reflection of the refractive medium 30 reflects the electromagnetic radiation towards the detector $D_2$. The total internal reflection of the refractive medium 30 is disturbed or changed by contact from the finger F as shown with respect to the emitter $E_1$ and detector $D_1$ such that the direction of reflected electromagnetic radiation is changed and the detector $D_1$ detects a reduced amount of electromagnetic radiation. The refractive medium 30 can be formed of any suitable material, including transparent and/or translucent plastic, elastomer materials, or glass. In some embodiments, the surface 30S can include a reflective or partially reflective coating. Thus, the presence of the finger F can be detected by a reduction or elimination of the detected electromagnetic radiation in detector $D_1$.

Figure 8:
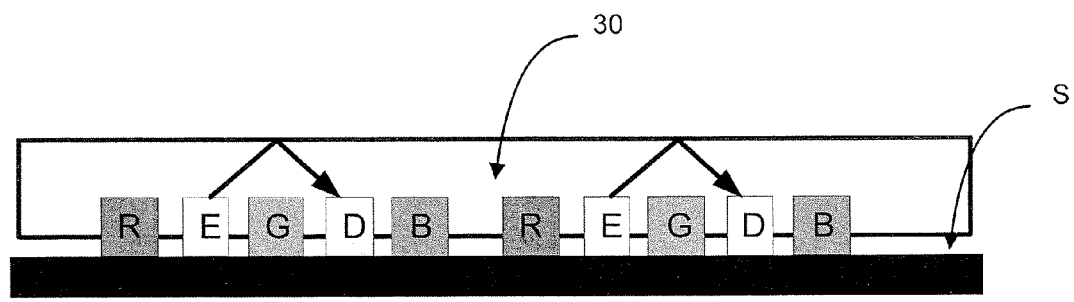
FIG. 8 is a cross sectional view of another touch-sensitive display according to some embodiments of the present invention.

In some embodiments as shown in FIG. 8, the emitters E and detectors D can be provided on a substrate S together with light emitters R, G, B for red, green and blue light respectively. The light emitters R, G, B can be LEDs or OLEDs. Accordingly, the emitters E and/or detectors D can be integrated in the display.

Figure 9:
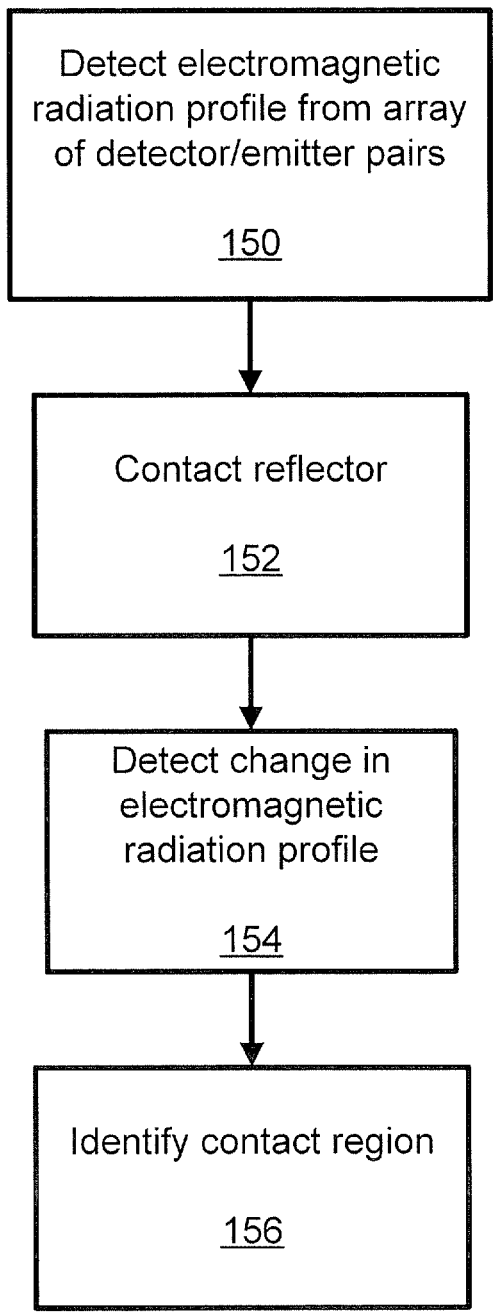
FIG. 9 is a flowchart illustrating operations according to embodiments of the current invention.

As illustrated in FIG. 9, the emitters E and detectors D can be used to detect an electromagnetic radiation profile of the display (Block 150), for example, by detecting an amount of electromagnetic radiation detected by an array of detectors D on the display 12'. The refractive medium of the display can be contacted (Block 152), and a resulting change in the electromagnetic radiation profile can be detected (Block 154). The contact region can be detected (Block 156), for example, based on an identification of the area in which the detectors detect a reduced amount of the reflected light.

In particular embodiments, the configuration shown in FIGS. 7 and 8 can include additional emitters E and detectors D that are configured to detect a user input object that is not in contact with the display 12' as is described with respect to FIGS. 2-6. The surface of the refractive medium 30 of FIGS. 7 and 8 can become reflective based on the incident angle of the electromagnetic radiation emitted by an emitter E (e.g., about 45 degrees for a plastic or glass and air interface). At other angles, the surface of the refractive medium 30 can be transmissive. Accordingly, the incident angles of the emitters E on the refractive medium 30 can be selected to provide both emitter E and detector D pairs that are configured as described with respect to FIGS. 7 and 8 (i.e., to detect reflected electromagnetic radiation and disruptions thereof by contact with the refractive medium 30) and emitters E that emit or transmit electromagnetic radiation through the refractive medium 30 as described with respect to FIGS. 2-6 (i.e., to detect user input objects that are spaced apart from the display 12, 12').

Figure 10:
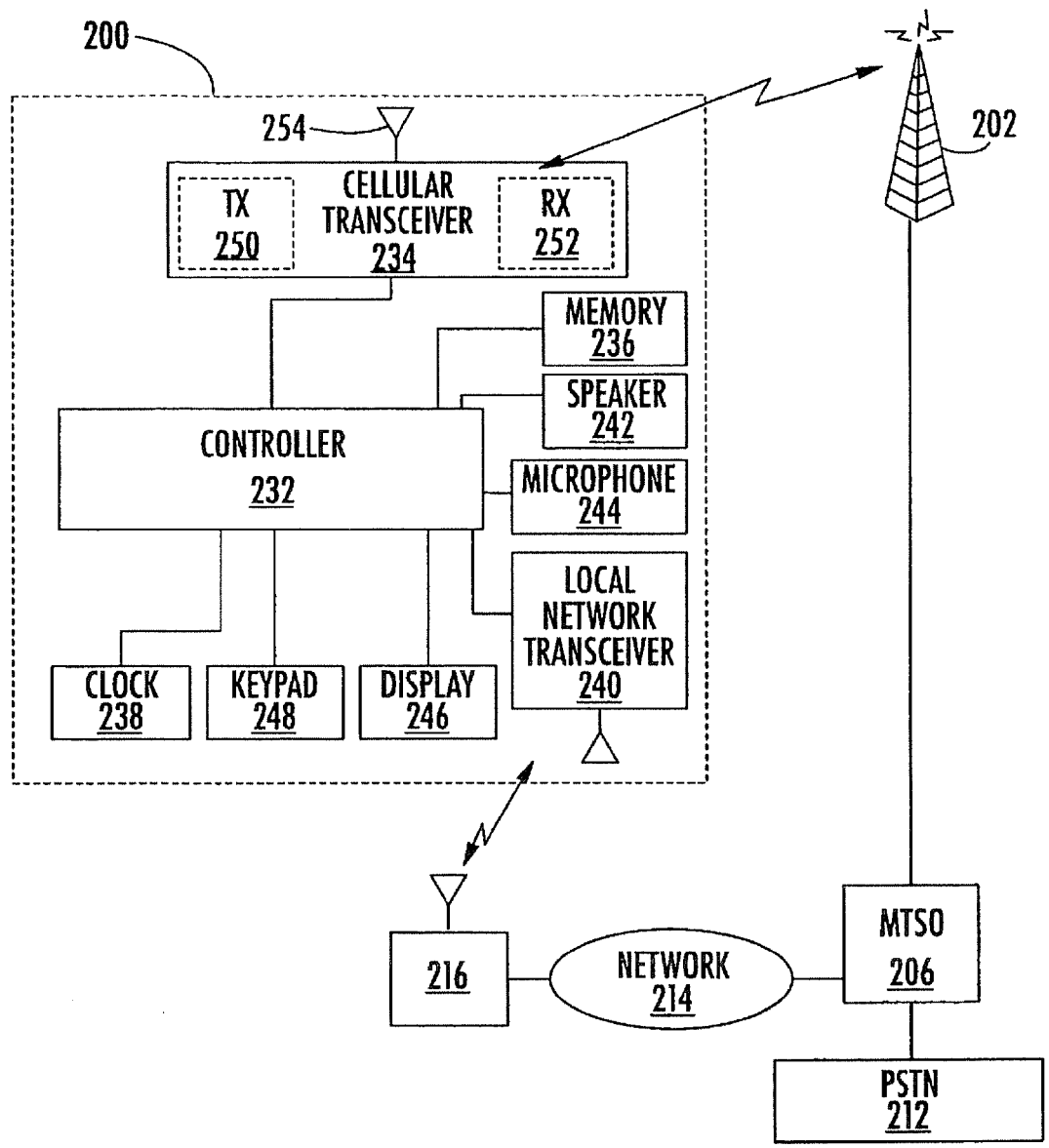
FIG. 10 is a schematic block diagram illustrating a wireless communication system with a wireless mobile communications device according to some embodiments of the invention.

FIG. 10 is a schematic block diagram of a wireless communication system that includes a wireless terminal 200, such as a mobile wireless communications terminal, that receives wireless communication signals from a cellular base station 202 and/or a wireless local network 216. The cellular base station 202 is connected to a MTSO 206, which, in turn, is connected to a PSTN 212, and a network 214 (e.g., Internet). The mobile terminal 200 may communicate with the wireless local network 216 using a communication protocol that may include, but is not limited to, 802.11a, 802.11b, 802.11e, 802.11g, 802.11i, and/or other wireless local area network protocols. The wireless local network 216 may be connected to the network 214.

In some embodiments of the invention, the mobile terminal 200 includes a controller 232, a cellular transceiver 234, a memory 236, a timing circuit (clock) 238, a local network transceiver 240, a speaker 242, a microphone 244, a display 246 and a keypad 248. The display 246 can incorporate the elements of the displays 12, 12' discussed herein.

The memory 236 stores software that is executed by the controller 232, and may include one or more erasable programmable read-only memories (EPROM or Flash EPROM), battery backed random access memory (RAM), magnetic, optical, or other digital storage device, and may be separate from, or at least partially within, the controller 232. The controller 232 may include more than one processor, such as, for example, a general purpose processor and a digital signal processor, which may be enclosed in a common package or separate and apart from one another.

In particular, the controller 232 may be configured to control operations as described with respect to FIGS. 1-9, for example, by identifying a user input from the electromagnetic radiation profile detected by the detectors D of the display 12, 12'.

The cellular transceiver 234 typically includes both a transmitter (TX) 250 and a receiver (RX) 252 to allow two way communications, but the present invention is not limited to such devices and, as used herein, a "transceiver" may include only the receiver 252. The mobile terminal 200 may thereby communicate with the base station 202 using radio frequency signals, which may be communicated through an antenna 254. For example, the mobile terminal 200 may be configured to communicate via the cellular transceiver 234 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments, the antennas 228 and 254 may be a single antenna.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A mobile device for detecting user input on a display, the mobile device comprising: a hand-held display unit comprising: a display having an electromagnetic radiation detector is configured to detect an electromagnetic radiation profile responsive to a position of a user input object when the position of the user input object is spaced apart from the display; and a controller configured to identify a user input from the electromagnetic radiation profile; wherein the display further comprises an electromagnetic radiation emitter configured to emit electromagnet radiation in a direction away from the display, and the electromagnetic radiation detector is configured to detect electromagnetic radiation reflected from a user input object in a direction toward the display, wherein the electromagnetic radiation detector comprises a first electromagnetic radiation detector, the display further comprising an electromagnetic radiation emitter, a second electromagnetic radiation detector, and a refractive medium, wherein the electromagnetic radiation emitter is configured to emit electromagnetic radiation in a direction toward the refractive medium, and the refractive medium is configured to reflect electromagnetic radiation in a direction toward the second electromagnet radiation detector, the refractive medium being further configured to change a direction of reflected electromagnetic radiation responsive to contact from a user input object, wherein the controller is further configured to identify a user input responsive to an amount of electromagnetic radiation detected by the second electromagnetic radiation detector.

2. The mobile device of claim 1, wherein the electromagnetic radiation detector is configured to detect an obstruction of background electromagnetic radiation responsive to a position of a user input object.

3. The mobile device of claim 1, wherein the electromagnetic radiation detector is configured to detect thermal radiation from a user input object, wherein the user input object comprises a digit of a user's hand.

4. The mobile device of claim 1, wherein the controller is configured to display an icon on the display responsive to the detection of electromagnetic radiation reflected from a user input object in a direction toward the display.

5. The mobile device of claim 4, wherein the controller is configured to track movement of the user input object by displaying the icon in a region responsive to movement of the user input object.

6. The mobile device of claim 5, wherein the display further comprises a touch-sensitive display, and the controller is configured to perform an operation responsive to contact with the user input object.

7. The mobile device of claim 1, wherein the electromagnetic radiation detector is configured to detect infrared light.

8. The mobile device of claim 1, wherein the electromagnetic radiation emitter is configured to emit electromagnetic radiation in a direction away from the electromagnetic radiation detector such that electromagnetic radiation emitted by the electromagnetic radiation emitter is not received by the electromagnetic radiation detector when the user input object is not positioned to reflect the electromagnetic radiation toward the electromagnetic radiation detector.

9. A touch-sensitive display system comprising:
a display comprising an electromagnetic radiation emitter, an electromagnetic radiation detector, and a refractive medium, wherein the electromagnetic radiation emitter is configured to emit electromagnetic radiation in a direction toward the refractive medium, and the refractive medium is configured such that the electromagnetic radiation passes through the refractive medium and is reflected in a direction toward the detector in an absence of contact from a user input object and to change the refractive medium changes a direction of reflected electromagnetic radiation responsive to contact from a user input object; and
a controller configured to identify a user input responsive to an amount of electromagnetic radiation detected by the electromagnetic radiation detector.

10. The display system of claim 9, wherein the refractive medium is configured to direct at least a portion of the reflected electromagnetic radiation away from the electromagnetic radiation detector responsive to contact from the user input object and the controller is configured to identify a user input responsive to a reduced amount of electromagnetic radiation detected by the electromagnetic radiation detector.

11. The display system of claim 9, wherein the refractive medium changes a refractive index thereof responsive to contact of the user input object.

12. The display system of claim 9, wherein the display comprises an array of respective electromagnetic radiation emitters and electromagnetic radiation detectors, wherein the electromagnetic radiation emitters are configured to emit electromagnetic radiation in a direction toward the refractive medium, and the refractive medium is configured to reflect electromagnetic radiation in a direction toward one of the respective electromagnetic radiation detectors in an absence of contact from a user input object and to change a direction of reflected electromagnetic radiation responsive to contact from the user input object.

13. The display system of claim 12, wherein the array of electromagnetic radiation detectors outputs an electromagnetic radiation profile to the controller, and the controller is configured to identify a location of contact of the user input object based on the electromagnetic radiation profile.

14. The display system of claim 13, wherein the location of contact of the user input object comprises a region of reduced electromagnetic radiation.

15. The display system of claim 12, wherein the display comprises a substrate having a plurality of LEDs thereon, and wherein the array of electromagnetic radiation emitters and electromagnetic radiation detectors are on the substrate.

16. The display system of claim 15, wherein the refractive medium comprises a layer on the substrate and having a surface that reflects electromagnetic radiation emitted from the electromagnetic radiation emitters.

17. The display system of claim 9, wherein the electromagnetic radiation emitter is an infrared emitter and the electromagnetic radiation detector is an infrared detector.

18. A method for detecting user input on a display, the method comprising: emitting electromagnetic radiation away from the display; the display comprising a refractive medium; detecting an electromagnetic radiation profile using an array of detectors on the display, wherein the electromagnetic radiation profile comprises electromagnetic radiation reflected from a user input object towards the display when a position of the user input object is spaced apart from the display and electromagnetic radiation that is reflected in a direction toward the detector by the refractive medium in an absence of contact from the user input object, wherein the refractive medium changes a direction of reflected electromagnetic radiation responsive to contact from the user input object; and identifying a user input responsive to the electromagnetic radiation profile.

* * * * *

UNITED STATES PATENT AND TRADEMARK OFFICE
CERTIFICATE OF CORRECTION

PATENT NO. : 9,323,410 B2  
APPLICATION NO. : 12/250108  
DATED : April 26, 2016  
INVENTOR(S) : Jorgen Birkler Page 1 of 1

It is certified that error appears in the above-identified patent and that said Letters Patent is hereby corrected as shown below:

On Title Page:  
Item 73, Assignee:  
Please correct "Sony Ericsson Mobile Communications AB, Lund, SE" to read  
--Sony Corporation, Tokyo, JP  
      Sony Mobile Communications AB, Lund, SE--

Signed and Sealed this  
Seventh Day of June, 2016

Michelle K. Lee  
*Director of the United States Patent and Trademark Office*